(12) United States Patent
Palombo

(10) Patent No.: US 10,307,726 B1
(45) Date of Patent: Jun. 4, 2019

(54) MAGNETIC CHEMICAL REACTOR

(71) Applicant: Rodolfo Palombo, Melbourne, FL (US)

(72) Inventor: Rodolfo Palombo, Melbourne, FL (US)

( * ) Notice: Subject to any disclaimer, the term of this patent is extended or adjusted under 35 U.S.C. 154(b) by 0 days.

(21) Appl. No.: 16/164,984

(22) Filed: Oct. 19, 2018

Related U.S. Application Data

(63) Continuation-in-part of application No. 15/330,900, filed on Nov. 15, 2016, now abandoned.

(51) Int. Cl.
*B01J 19/08* (2006.01)
*B01J 8/00* (2006.01)
*B01J 23/00* (2006.01)
*B01J 8/42* (2006.01)
*B01J 8/06* (2006.01)

(52) U.S. Cl.
CPC ............ *B01J 19/087* (2013.01); *B01J 8/005* (2013.01); *B01J 8/065* (2013.01); *B01J 8/42* (2013.01); *B01J 23/00* (2013.01)

(58) Field of Classification Search
CPC .................................................. B01J 2219/085
USPC ....................................................... 422/186.01
See application file for complete search history.

(56) References Cited

U.S. PATENT DOCUMENTS

| | | | | |
|---|---|---|---|---|
| 4,255,403 A | * | 3/1981 | Mayer .................... | B01D 46/32 204/155 |
| 4,292,171 A | * | 9/1981 | Mayer .................... | C10G 11/18 208/108 |
| 5,478,149 A | * | 12/1995 | Quigg .................. | B01F 13/0827 366/273 |
| 6,962,681 B2 | * | 11/2005 | Maganas ................ | B01D 53/83 423/212 |
| 7,396,515 B2 | | 7/2008 | Arndt et al. | |
| 8,512,644 B1 | * | 8/2013 | Maganas .................. | F23M 5/00 422/140 |
| 9,463,430 B2 | | 10/2016 | Luo et al. | |
| 9,669,379 B2 | * | 6/2017 | Klausner .................... | B01J 8/42 |
| 9,675,930 B2 | * | 6/2017 | Awaji ..................... | B01D 53/32 |
| 2004/0013584 A1 | * | 1/2004 | Arndt .................. | B01F 13/0076 422/186.04 |
| 2005/0001556 A1 | * | 1/2005 | Hoffman ........... | H01J 37/32091 315/111.91 |
| 2013/0039815 A1 | | 2/2013 | Murata | |
| 2014/0346034 A1 | | 11/2014 | Klausner et al. | |
| 2015/0024924 A1 | | 1/2015 | Senatalar et al. | |
| 2015/0182929 A1 | * | 7/2015 | Luo ........................... | B01J 8/22 422/140 |

OTHER PUBLICATIONS

Nadon, et al., Industrial Electricity: The Fundamentals of Electricity, Machines, Electronics, Illumination, and Controlling Equipment, 1951, pp. 114-115, 3 pages.

\* cited by examiner

*Primary Examiner* — Nina Bhat
(74) *Attorney, Agent, or Firm* — Brian S. Steinberger; Law Offices of Brian S. Steinberger, P.A.

(57) ABSTRACT

Systems, devices, and methods for providing a magnetic coil assembly wired in series or parallel at low or high voltage provided from a direct current source or an alternating current source that can produce a concentrated magnetic energy at the central core of the magnetic coil to energize a tubular reactor passing through the coil assembly core. The magnetic energy can be transferred outside of the coil assembly core by a magnetic transfer probe to energize a magnetic chemical reactor vessel.

19 Claims, 5 Drawing Sheets

MAGNETIC CHEMICAL REACTOR

CROSS REFERENCE TO RELATED APPLICATION

This application is a Continuation-In-Part of U.S. patent application Ser. No. 15/330,900 filed Nov. 15, 2016, the entire disclosure of which is incorporated herein by specific reference thereto.

FIELD OF INVENTION

This invention relates to chemical reactors, and in particular to systems, devices, and methods for providing a magnetic coil assembly wired in series or parallel at low or high voltage that can produce a concentrated magnetic energy in a core section of the magnetic coil to energize a tubular reactor passing through the coil assembly core, and in another embodiment, the magnetic energy can be transferred outside of the coil assembly core by a magnetic transfer probe to energize a magnetic chemical reactor.

BACKGROUND AND PRIOR ART

U.S. Pat. No. 9,463,430 to Luo et al., entitled, Magnetically Inductive Slurry Bubble Column Reactor, utilizes magnetic force to maintain the catalyst stable because the flow of reactants will carry it up in the column of the reactor. Therefore, the magnetic force pushes down on the catalyst particles to stabilize the catalyst in the areas needed, the system has different values of magnetic force from 200 amp per meter to 2000 amp per meter for stabilization. At the top of the reactor a magnetic screen pushes down on the catalyst to prevent the loss of catalyst with the product effluent. This section works from 2000 amp per meter to 7000 amp per meter.

U.S. Pat. No. 7,396,515 to Arndt et al., Reactor for the Treatment of a Sample Medium uses a magnetic energy to agitate a sample to be analyzed in a micro reactor. The change in direction of the magnetic field in the reactor makes the catalyst move back and forth creating agitation. The generator as described is in essence an alternating current generator.

Thus, the need exists for a magnetic field chemical reactor with variable velocity for input of processing aids and reactants and a minimal, stable and effective amount of catalyst in contact with reactants to solve problems with the prior art reactors.

SUMMARY OF THE INVENTION

A primary objective of the present invention is to provide systems, devices, and methods for providing an efficient, effective magnetic chemical reactor wherein a magnetic coil assembly provides a source of power for the chemical reactor.

A secondary objective of the present invention is to provide systems, devices, and methods for providing a magnetic chemical reactor that works efficiently at lower temperatures, below approximately 200° C., in combination with a magnetic flux.

A third objective of the present invention is to provide systems, devices, and methods for providing a magnetic chemical reactor that is utilized in any chemical reaction system for synthesis or processing of organic, inorganic or biochemical reactions.

A fourth objective of the present invention is to provide systems, devices, and methods for providing a magnetic chemical reactor to treat sewage and waste water.

Further objects and advantages of this invention will be apparent from the following detailed description of the presently preferred embodiments which are illustrated schematically in the accompanying drawings.

BRIEF DESCRIPTION OF THE FIGURES

The drawing figures depict one or more implementations in accord with the present concepts, by way of example only, not by way of limitations. In the figures, like reference numerals refer to the same or similar elements.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Not to be bound by any theory, the present invention illustrates some basic facts about magnetic energy. First, magnetic energy promotes and accelerates chemical reactions. Secondly, a magnetic coil concentrates magnetic energy in the central core of the coil. Third, a tubular vessel as used herein is an efficient reactor with a probe inside whether or not under magnetic energy. In addition, more than one magnetic coil assembly may be required to energize a reactor vessel, either for capacity or retention time or both.

Reference will now be made in detail to the embodiments of the present invention, examples of which are illustrated in the accompanying drawings. The embodiments are described below to explain the invention by referring to the figures containing numerical identifiers and components listed below.

Numerical Identifier Component/Description

Figure 5:
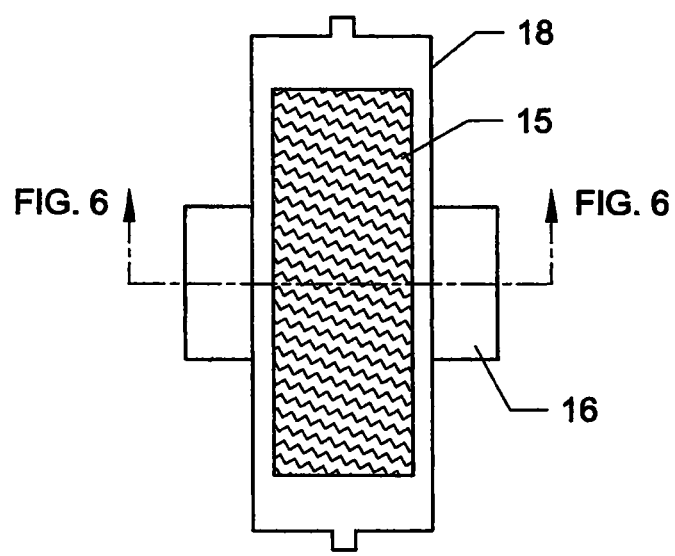
FIG. 5 shows a magnetic coil chemical reactor with an outside transfer probe extending to the left side and right side of the magnetic coil chemical reactor.
Figure 6:
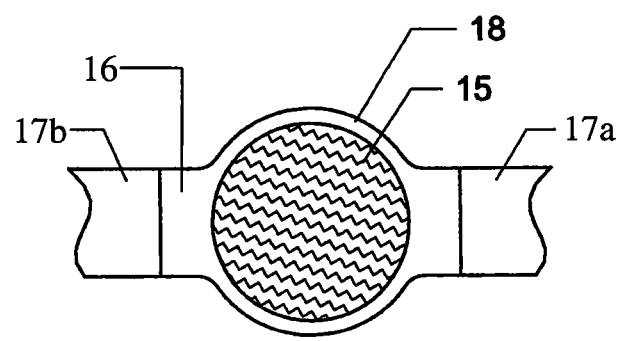
FIG. 6 is a cross-sectional view of FIG. 5 along arrows 6X.
Figure 7:
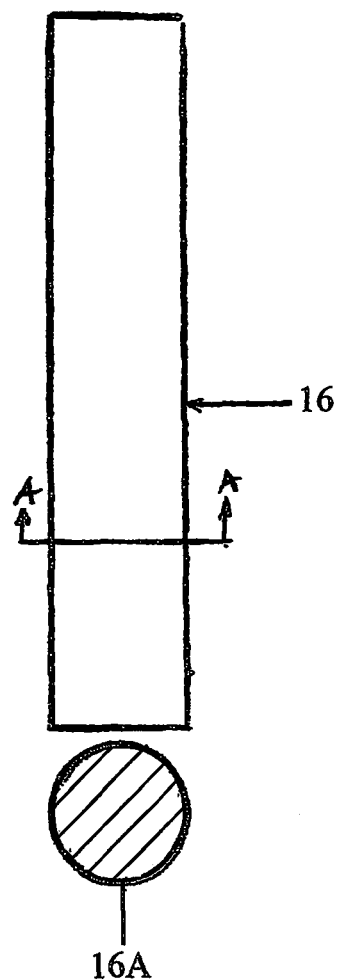
FIG. 7 shows the detail of a magnetic transfer probe that brings magnetic flux outside of the magnetic coil.
Figure 8:
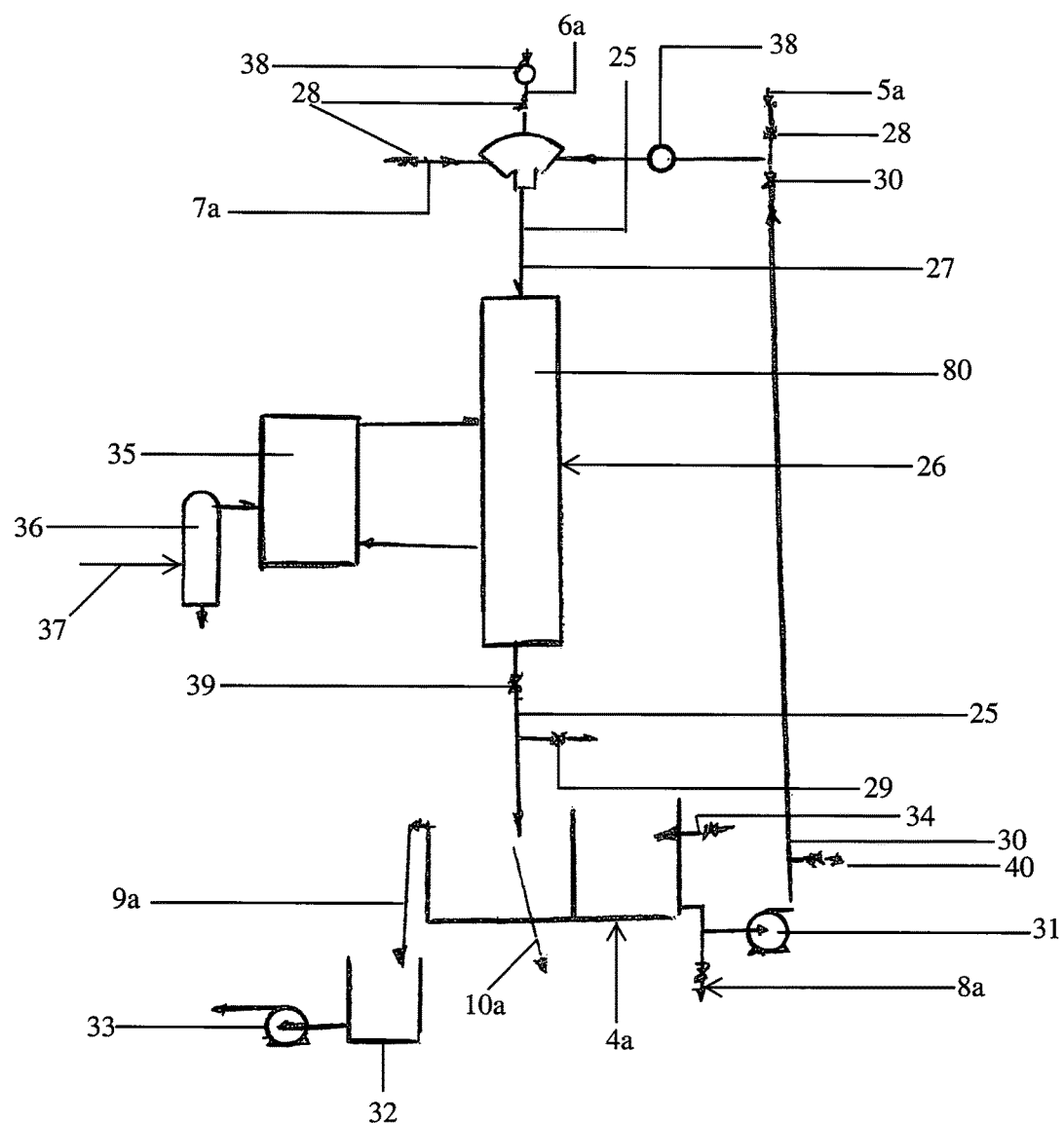
FIG. 8 is a schematic design of a magnetic coil chemical reactor assembly having over 7 times the capacity of the pilot plant testing apparatus in FIG. 2.

1 Expanded magnetic coil to demonstrate magnetic flux generation (Prior Art).
2 Magnetic reactor vessel for pilot plant test assembly.
3 Mixing chamber for pilot plant test assembly, (mixing tee)
4 Separator vessel for pilot plant test assembly.
4a Separator vessel for magnetic chemical reactor in FIG. 8
5 Water inlet to mixing chamber for pilot plant test assembly.
5a Water inlet to mixing chamber for magnetic chemical reactor in FIG. 8
6 Gas inlet to mixing chamber for pilot plant test assembly.
6a Gas inlet to mixing chamber for magnetic chemical reactor in FIG. 8
7 Steam inlet to mixing chamber for pilot plant test assembly.
7a Steam inlet to mixing chamber for magnetic chemical reactor in FIG. 8
8 Water phase product from separator vessel in pilot plant test assembly.
8a Water phase product from separator vessel in magnetic chemical reactor of FIG. 8
9 Oil phase product from separator vessel in pilot plant test assembly
9a Oil phase product from separator vessel in magnetic chemical reactor of FIG. 8
10 Gas phase product from separator vessel in pilot plant test assembly
10a Gas phase product from separator vessel in magnetic chemical reactor of FIG. 8
11 Magnetic chemical reactor with magnetic probe positioned in core section of magnetic coil assembly
12 Magnetic coil assembly surrounding the magnetic probe disposed in the coil assembly core
13 Non-magnetic casing enclosing the magnetic coil assembly
14 Elongated tubular reactor vessel in the magnetic chemical reactor (such as steel, copper, aluminum, ceramic, preferably steel or copper)
15 Magnetic probe disposed in core of magnetic coil assembly
16 Magnetic transfer probe-solid magnetic bar
16 A Cross-sectional view of a solid magnetic transfer probe.
17a Magnetic transfer probe prong that extends to right side of a magnetic core assembly
17b Magnetic transfer probe prong that extends to left side of a magnetic core assembly
18 Magnetic reactor vessel outside of magnetic coil assembly surrounding the magnetic probe disposed in the coil assembly core
19 Coolant inlet for magnetic chemical reactor
20 Coolant outlet for magnetic chemical reactor
21 Magnetic coil assembly strip to align the coils
22 Magnetic coil wire with insulation
23 Electric current flow in direction of arrows
24 Magnetic flux inside magnetic coil
25 Temperature gauge
26 Magnetic coil assembly temperature gauge
27 Pressure gauge
28 Throttle control valve
29 Sample valve
30 Recycle water
31 Recycle pump
32 Oil receiving vessel
33 Oil transfer pump
34 Make up water
35 Dry air conditioning package
36 Air dryer
37 Make up air
38 Flow indicator
39 Back pressure valve
40 Water product outlet to storage
80 Magnetic chemical reactor shown in FIG 8

The following terms used in the Detailed Description are defined below.

The term "package" is used herein to include all the component parts and known elements in an air conditioning device or unit; thus, the dry air conditioning package reference includes a compressor, on/off switching mechanisms, tubing, and the like.

The phrase "magnetic probe" is used to refer to a metal with magnetic properties that can be coated with a thin-film catalyst and used inside a chemical reactor to increase the magnetic energy going into the reaction and increase catalytic contact with reactants. A magnetic probe can be a solid piece, multiple pieces or lamellas design.

The phrase "magnetic transfer probe" is used to refer to a solid piece of metal with magnetic properties that is used to transfer magnetic energy from a central core of an energized magnetic coil assembly to a chemical reactor that is outside of the coil assembly core. A catalyst is not coated on the transfer probe.

Figure 1:
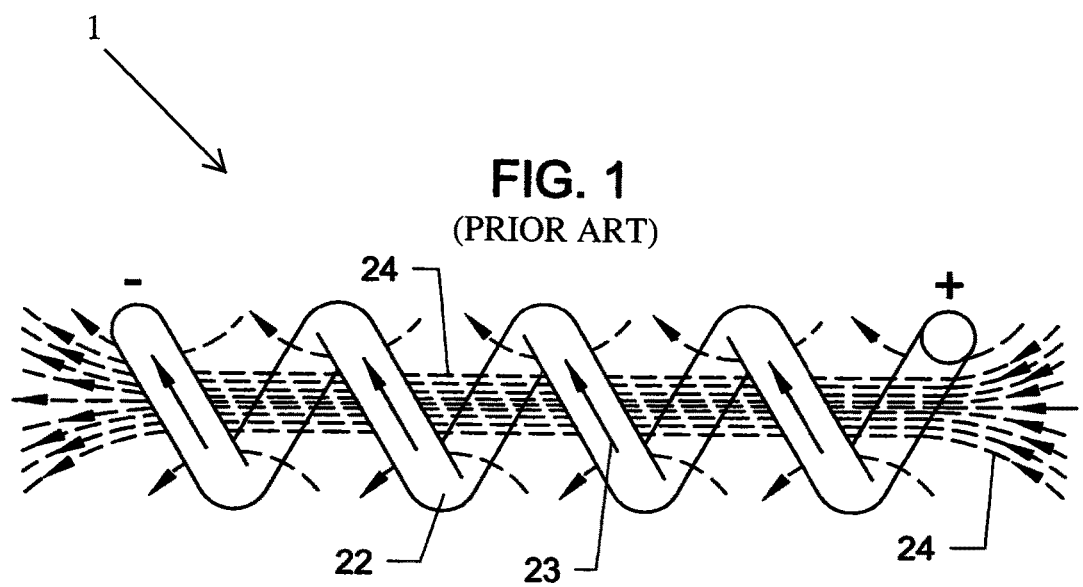
FIG. 1 shows an expanded coil with magnetic flux. (Prior Art)

Reference is now made to the Figures that are illustrative of the magnetic chemical reactor disclosed herein. In FIG. 1, a prior art illustration 1, found in Industrial Electricity: *The Fundamentals of Electricity, Machines, Electronics, Illumination, and Controlling Equipment* by J. M. Nadon et al., 2nd edition, D. Van Nostrand Company (1951), at page 114, shows an expanded magnetic coil 22 with electric current 23 flowing through the insulated wire coil 22 creating a magnetic flux 24. The majority of the magnetic flux 24 is inside of the coil only a few lines escape from the coil. In use, the coil is compressed and the coil wires are without gaps. All the generated magnetic flux flows inside of the core of the coil. The electric current 23 enters at the positive anode and flows toward the negative cathode. The current useful in the present invention is alternating current (AC) or direct current (DC); direct current is preferred because it is most efficient.

Figure 2:
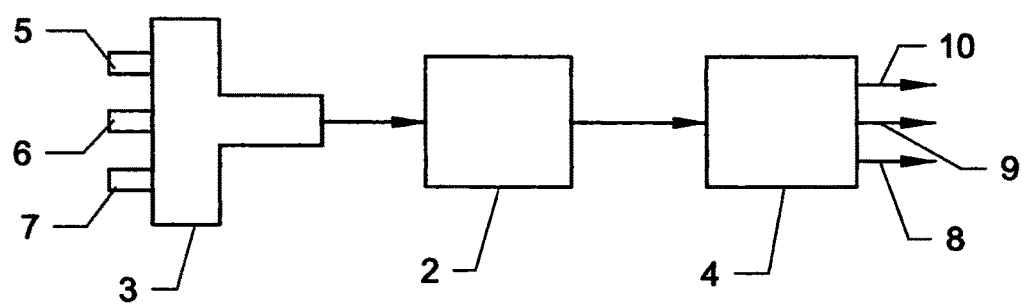
FIG. 2 shows a pilot plant testing apparatus with mixing tee, chemical reactor and separator vessel.

In FIG. 2, a magnetic coil chemical reactor for a pilot plant is shown with the major components comprising a reactor vessel 2, a mixing chamber 3, also known as a mixing tee; and a separator vessel 4. The process for using the magnetic coil chemical reactor requires use of water inlet 5 for reactant water, gas inlet 6 for gases, including, but not limited to, flue gases from a power plant with smoke, and steam or water vapor inlet 7 for heating reactants; heating up to 300° F. (148.9° C.) is a preferred operating parameter.

From the mixing chamber 3, reactants and reagents flow into the reactor vessel 2 and after processing, the products and by-products flow into the separator vessel 4 where reaction products and by-products are collected and separated. The separator vessel 4 has a partitioned wall inside to divide into two sections. The partition is open at the bottom so water will flow to one side at the bottom. Normally the water level is maintained high. On the other side of the partition, the oil is removed flowing over a weir at the top. The gas is collected from the top. The water-based by-product discharged at output port 8 must be analyzed for valuable product that warrants recovery, what is left must be evaluated for disposal. The oil based by-product is discharged at output port 9 and must be analyzed for sale, usually to oil refineries. The gaseous by-products are discharged at output port 10 and evaluated for product that may be cost effective to recover, if contaminated, must be incinerated in a stack burner. Solid material is discharged below the water level.

A pilot plant as outlined here may take many runs with different catalysts, at different temperatures and pressures and different rate of reactants. In addition, the product stream may require further treatment.

Figure 3:
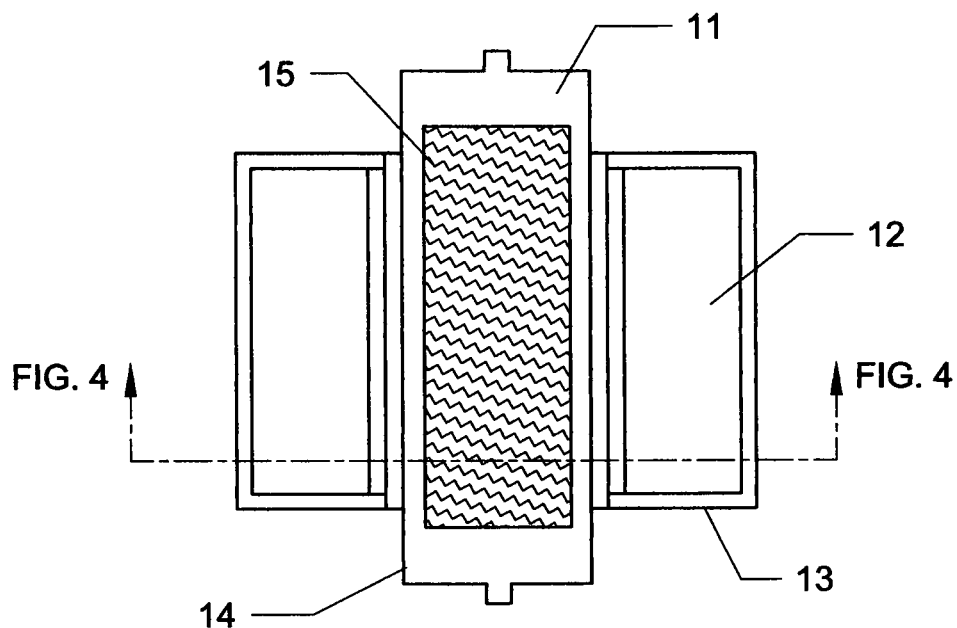
FIG. 3 shows a block diagram of a magnetic coil chemical reactor.

With regard to FIG. 3, by placing an elongated tubular vessel 14 thru the central core of a magnetic coil 12, the magnetic chemical reactor is subject to the magnetic energy produced by the magnetic coil 12. Inside the reactor, a magnetic probe 15 is installed that will subject the reactants and catalyst to an increased magnetic energy. All the components are housed in a magnetic coil 12 encasing package 13.

In catalyzed reactions, a thin-film catalyst is applied to the interior wall surface of the magnetic reactor vessel 2 (in FIG. 2) and serves to protect the interior wall surface of the reactor vessel 2 and increase the speed of the reaction occurring within the vessel. In FIG. 3, the catalyst is applied to the inside of the elongated tubular reactor vessel 14 and all components of the magnetic probe 15. The thin-film catalyst in FIG. 2 and FIG. 3 is applied by cladding or other applicable procedures, such as dissolving the catalyst in an acid and cladding. The catalyst is applied to the magnetic or nonmagnetic surfaces to protect the material from being attacked by the reactants under the high magnetic energy.

A thin-film catalyst is selected from the group consisting of silver, copper, gold, chromium, platinum or aluminum and alloys thereof. The advantages of the thin-film catalyst coating include, but are not limited to, allowing the magnetic chemical reactor to be effective at low velocity to high velocity flow rates of reactants, thus simplifying controls; allowing for minimal use of the catalyst because it is a thin film on the magnetic parts in contact with reactants; allowing the magnetic chemical reactor to work efficiently at lower temperatures, below 200° C. The present invention is not to be limited by the catalysts named herein, there are other commercially available catalysts that are suitable for the invention.

Thin-film catalysts used in the present invention are applied to the interior walls of the chemical reactor vessel and to the exterior surface of the magnetic probe 15.

The magnetic flux that ionizes water and other reactants are influenced by the magnetic flux which affects chemical bonds, thus when in contact with the catalyst will cause the reaction, in addition the catalyst is also affected by the magnetic flux.

Figure 4:
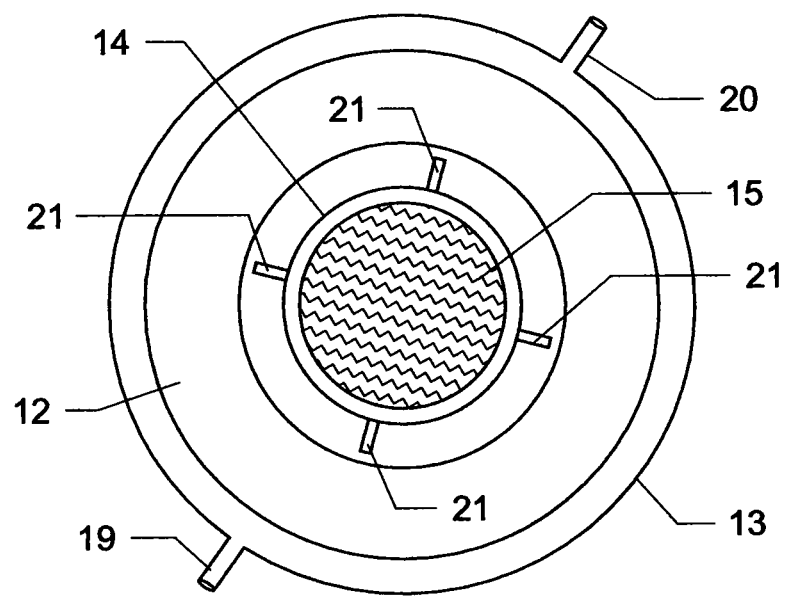
FIG. 4 is a cross-sectional view of FIG. 3 along arrows 4X.

In FIG. 4, a cross-sectional view is provided of the magnetic chemical reactor shown in FIG. 3. The magnetic coil assembly 12 is surrounded by a magnetic coil casing 13 which is a nonmagnetic enclosure. An elongated tubular reactor vessel 14 is inserted through the central core of the coil assembly 12. A magnetic probe 15 fills the central core of the coil 12. The magnetic probe is designed to maximize the contact of reactants and catalyst. The coil assembly 12 has a plurality of magnetic coil assembly strips 21 to align the coils. The magnetic coil assembly strips 21 allow the coil assembly to be suspended within the reactor so that air can circulate around the coil. The cross-sectional view in FIG. 4 also shows that the magnetic coil casing 13 has a coolant inlet 19 and a coolant outlet 20 to assist with temperature regulation and control.

The magnetic coil assembly casing 13 is made of nonmagnetic materials selected from the group consisting of aluminum, copper, plastic, glass, ceramic or ceramic composites. The elongated tubular reactor vessel 14 is fabricated from magnetic materials, including, but not limited to, stainless steel, steel, or iron; or nonmagnetic materials, including, but not limited to, aluminum, copper, glass, plastic, ceramic or ceramic composites. The preferred materials for construction of the reactor vessel 14 are steel and copper.

In a second embodiment, the magnetic chemical reactor 18 in FIG. 5 is outside of the magnetic core 12 (shown in FIG. 4) and the magnetic probe 15 is disposed in the core of the magnetic coil assembly and replaces the elongated, tubular reactor vessel 14 (shown in FIG. 3 and FIG. 4). The magnetic transfer probe 16 extends laterally across the core and prong 17a extends to the right side of the magnetic core and prong 17b extends to the left side of the magnetic core to be connected to an outside chemical reactor, as shown in FIG. 6.

In FIG. 6, the magnetic transfer probe 16 is in contact with the magnetic probe 15 that is in the core of the magnetic coil assembly; thus allowing the magnetic transfer probe 16 and prongs 17a, 17b to transfer magnetic energy from the magnetic core to one or more reactor vessels outside of the core assembly. This arrangement is less efficient but can be operated at higher temperatures. This reactor is intended primarily for batch operation. After the reaction is complete the reactor can be removed for cleaning and sanitizing. This reactor without the magnetic feature can be used for very high temperature reactions.

As an upgrade to the system shown on FIG. 2, the following components are shown in FIG. 8.

First, a magnetic coil assembly 80 is fabricated from ten-gage copper wire, enamel coated, 60 AMP capacity, and temperature rating 185° F. (85° C.). With five coils in parallel, the magnetic coil assembly has 300 AMP capacity.

Second, a cooling assembly includes a closed circuit dry air conditioning package 35 that receives pressurized air 37 that passes through a drying unit 36 before it flows into the dry air conditioning package 35 feeding dry air to the magnetic coil assembly 80 and returns air from the magnetic coil assembly 80 to the dry air conditioning package 35.

Third, centrifugal pumps 31, 33 are provided to control flow rates from the separator unit 4a of recycled water and oil products, respectively.

Fourth, throttle valves for controlling flow 28, flow indicators 38 for water inlet 5a, and gas inlet 6a are used in FIG. 8. The steam line will also have a throttling valve 28. Normally, steam is used only when a system starts up, and is seldom used during operation.

In addition to the components and functions described above, the upgraded system in FIG. 8 includes some of the same features disclosed in FIG. 2 such as, a separator vessel 4a, a water inlet 5a for reactant water or recycled water 30, gas inlet 6a for gases, steam or water vapor inlet 7a for heating reactants as required; heating up to 300° F. (148.9° C.) is a preferred operating parameter.

A process for using the magnetic chemical reactor in FIG. 8 includes allowing steam to flow through steam or vapor inlet 7a to heat up the reactor vessel wherein the flow is controlled by throttle valve 28. After start-up, other reactants are added to the mixing tee such as non-recycled water through inlet 5a, flowing through throttle valve 28 into the flow indicator 38 to the mixing tee. In addition, gas inlet 6a controlled by flow indicator 38 and a throttle valve for controlling flow 28 allows the addition of a gas or vapor stream.

Recycle pump 31 pumps recycled water 30 through pipes and valves through flow indicator 38. Thus, a feed of recycled water 30, water from water inlet 5a, gas from gas inlet 6a and other reactants enter the mixing tee and as the mixture of gas, water and other reactants travels to the magnetic coil reactor 80, the temperature of the mixtures is measured by a temperature gauge 25 and the pressure of the mixture is measured by a pressure gauge 27. During the reaction inside the vessel, temperatures are controlled by the cooling assembly of the closed circuit dry air conditioning package 35 and measurements of temperature of the magnetic coil assembly 80 are taken by a magnetic coil assembly temperature gauge 26.

After reactants and reagents have been processed in the magnetic reactor vessel 80, by-products and products flow out of the reactor vessel 80, a sample valve 29, positioned just below the back pressure valve 39, is used to analyze the reaction products and by-products. The effluent of products and by-products flows into the separator vessel 4a where reaction products and by-products are collected and separated.

The separator vessel 4a has a partitioned wall inside to divide into two sections. The partition is open at the bottom so water will flow to one side at the bottom. Normally the water level is maintained high. On the other side of the partition, the oil is removed flowing over a weir at the top. The gas is collected from the top. The water-based by-product discharged at output port 8a must be analyzed for valuable product that warrants recovery, what is left must be evaluated for disposal. The oil based by-product is discharged at output port 9a and must be analyzed for sale, usually to oil refineries. The gaseous by-products are discharged at output port 10a and evaluated for product that may be cost effective to recover, if contaminated, must be incinerated in a stack burner. Solid material is discharged together with the liquids.

Ancillary features of the separator vessel 4a include an oil receiving vessel 32 and an oil transfer pump 33 for handling oil products and by-products. Meanwhile, water-based products and by-products are fed to a make-up water outlet 34 and a water product outlet 40 for water-based products that are sent to storage.

Fifth, the magnetic chemical reactor 80 will have a capacity of producing over 7 times the capacity of pilot plant testing assembly shown in FIG. 2.

Sixth, electricity is from a direct current (DC) generator (not shown) and an alternating current (AC) supply is also available. AC is required if the reactants contain magnetic components. Under DC operation the magnetic components of the reactants are attracted to the magnetic surfaces of the reactor. And therefore, the particle will be stuck to the magnetic surfaces; and remain there, creating a build-up that eventually will affect the operation. AC is not a continuous source of energy; it is an oscillation of the magnetic flux. Therefore less efficient but will allow the gas and liquid flow to fluidize the particles when the magnetic flux reaches close to zero. The oscillation is caused by the changing of the north and south polarity every second.

Gauges, valves and pumps used in the fabrication of the magnetic chemical reactor disclosed herein are available commercially.

The present invention provides a novel magnetic chemical reactor that works efficiently at lower temperatures, below approximately 200° C., in combination with the energy of a magnetic flux concentrated in the core of a magnetic coil assembly or the energy transferred from the core of a magnetic coil assembly.

The term "approximately" can be +1-10% of the amount referenced. Additionally, preferred amounts and ranges can include the amounts and ranges referenced without the prefix of being approximately.

Although specific advantages have been enumerated above, various embodiments may include some, none, or all of the enumerated advantages.

Other technical advantages may become readily apparent to one of ordinary skill in the art after review of the following figures and description.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise specifically noted, articles depicted in the drawings are not necessarily drawn to scale.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A magnetic chemical reactor comprising a magnetic coil assembly having a central core;
an elongated tubular reactor vessel with at least one inlet port for reactants and reagents to flow into the reactor vessel, at least one outlet port from which reaction products and by-products are collected and separated, and an interior wall surface wherein the elongated tubular reactor vessel is disposed within the central core of the magnetic coil assembly; and an energizing element connected to the magnetic coil assembly to provide a concentrated magnetic energy to the elongated tubular reactor vessel within the central core.

2. The magnetic chemical reactor of claim 1, wherein the energizing element of the magnetic coil assembly is electrical wiring in series or parallel connected to at least one of a direct current source or an alternating current source.

3. The magnetic chemical reactor of claim 1, wherein the magnetic coil assembly is enclosed in a non-magnetic enclosure with a means for controlling temperature by circulating a coolant around the magnetic coil assembly enclosed in the non-magnetic enclosure, the non-magnetic enclosure has a coolant inlet and a coolant outlet.

4. The magnetic chemical reactor of claim 1, wherein the elongated tubular reactor vessel is fabricated from a magnetic material, selected from the group consisting of stainless steel, steel, and iron.

5. The magnetic chemical reactor of claim 1, wherein the elongated tubular reactor vessel is fabricated from a non-magnetic material, wherein the material is
aluminum, copper, glass, plastic, ceramic, or ceramic composite.

6. The magnetic chemical reactor of claim 3, further comprising a magnetic probe disposed within the interior of the elongated tubular reactor vessel wherein the magnetic probe is coated with a thin-film catalyst and used inside the magnetic chemical reactor to increase the magnetic energy going into a reaction and increase catalytic contact with reactants.

7. The magnetic chemical reactor of claim 1, further comprising a thin-film catalyst coating the interior wall surface of the elongated tubular reactor vessel.

8. The magnetic chemical reactor of claim 7, wherein the thin-film catalyst coating silver, copper, gold, chromium, platinum, aluminum or alloys thereof.

9. A magnetic chemical reactor comprising a magnetic coil assembly having a central core;
a magnetic transfer probe disposed within the central core to transfer a magnetic energy outside the magnetic coil assembly;
an energizing element connected to the magnetic coil assembly to produce a concentrated magnetic energy to the magnetic transfer probe within the central core; and
a reactor vessel located outside the central core of the magnetic coil assembly with at least one inlet port for reactants and reagents to flow into the reactor vessel, at least one outlet port from which reaction products and by-products are collected and separated, and an interior wall surface wherein a plurality of reactants and reagents is energized by the magnetic energy transferred by a magnetic transfer probe.

10. The magnetic chemical reactor of claim 9, wherein the energizing element of the magnetic coil assembly is electrical wiring in series or parallel connecting to at least one of a direct current source or an alternating current source.

11. The magnetic chemical reactor of claim 9, wherein the magnetic transfer probe is fabricated from a magnetic material, the magnetic material is stainless steel, steel, iron, or alloys thereof.

12. The magnetic chemical reactor of claim 11, wherein the magnetic transfer probe is a solid piece.

13. The magnetic chemical reactor of claim 9, wherein the magnetic transfer probe is coupled to a reactor vessel outside of the magnetic coil assembly to transfer a magnetic energy to said reactor vessel.

14. The magnetic chemical reactor of claim 9, wherein the magnetic coil assembly is enclosed in a non-magnetic enclosure with a means for controlling temperature by circulating a coolant around the magnetic coil assembly enclosed in the non-magnetic enclosure, the non-magnetic enclosure has a coolant inlet and a coolant outlet.

15. The magnetic chemical reactor of claim 9, wherein the magnetic coil assembly is enclosed in a non-magnetic enclosure.

16. The magnetic chemical reactor of claim 9, further comprising a thin-film catalyst coating on the interior wall surface of the reactor vessel.

17. The magnetic chemical reactor of claim 9, further comprising a magnetic probe with a thin-film catalyst coating located within the reactor vessel.

18. The magnetic chemical reactor of claim 16, wherein the thin-film catalyst coating on the interior wall surface of the reactor vessel is selected from silver, copper, gold, chromium, platinum, aluminum or derivative catalyst compositions thereof.

19. The magnetic chemical reactor of claim 17, wherein the thin-film catalyst coating on the magnetic probe silver, copper, gold, chromium, platinum, aluminum or derivative catalyst compositions thereof.

* * * * *